Aug. 2, 1966　　　　　　G. H. SMITH　　　　　3,263,853
UNDERGROUND METER BOX
Filed Oct. 8, 1962　　　　　　　　　　　　3 Sheets-Sheet 1
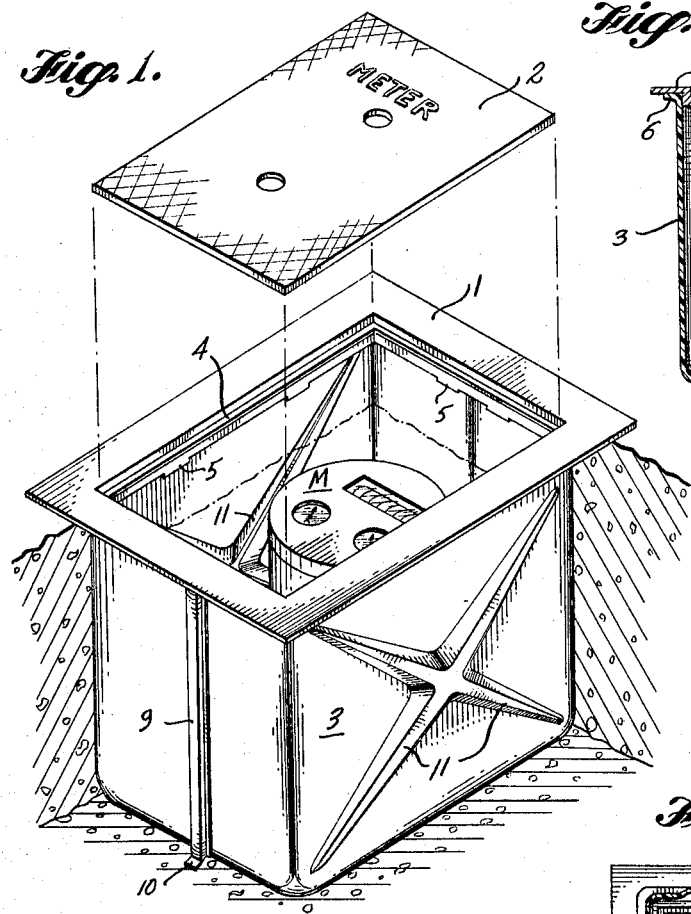
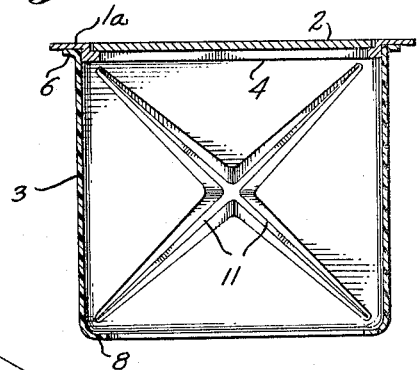
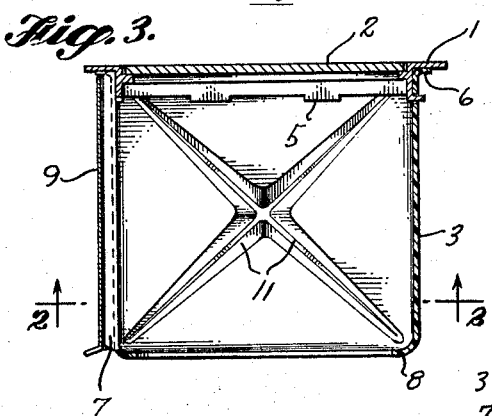
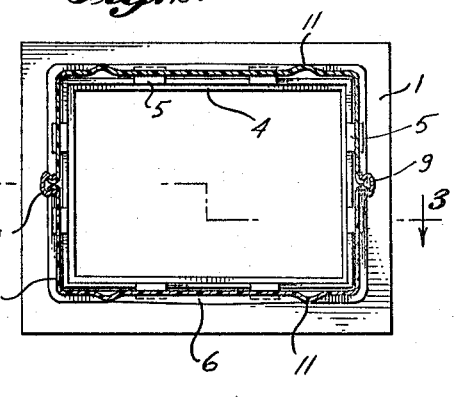
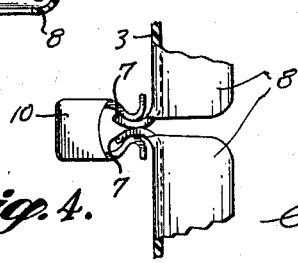
INVENTOR.
GROVER H. SMITH
BY Robert W. Beach
ATTORNEY Aug. 2, 1966  G. H. SMITH  3,263,853
UNDERGROUND METER BOX
Filed Oct. 8, 1962  3 Sheets-Sheet 2
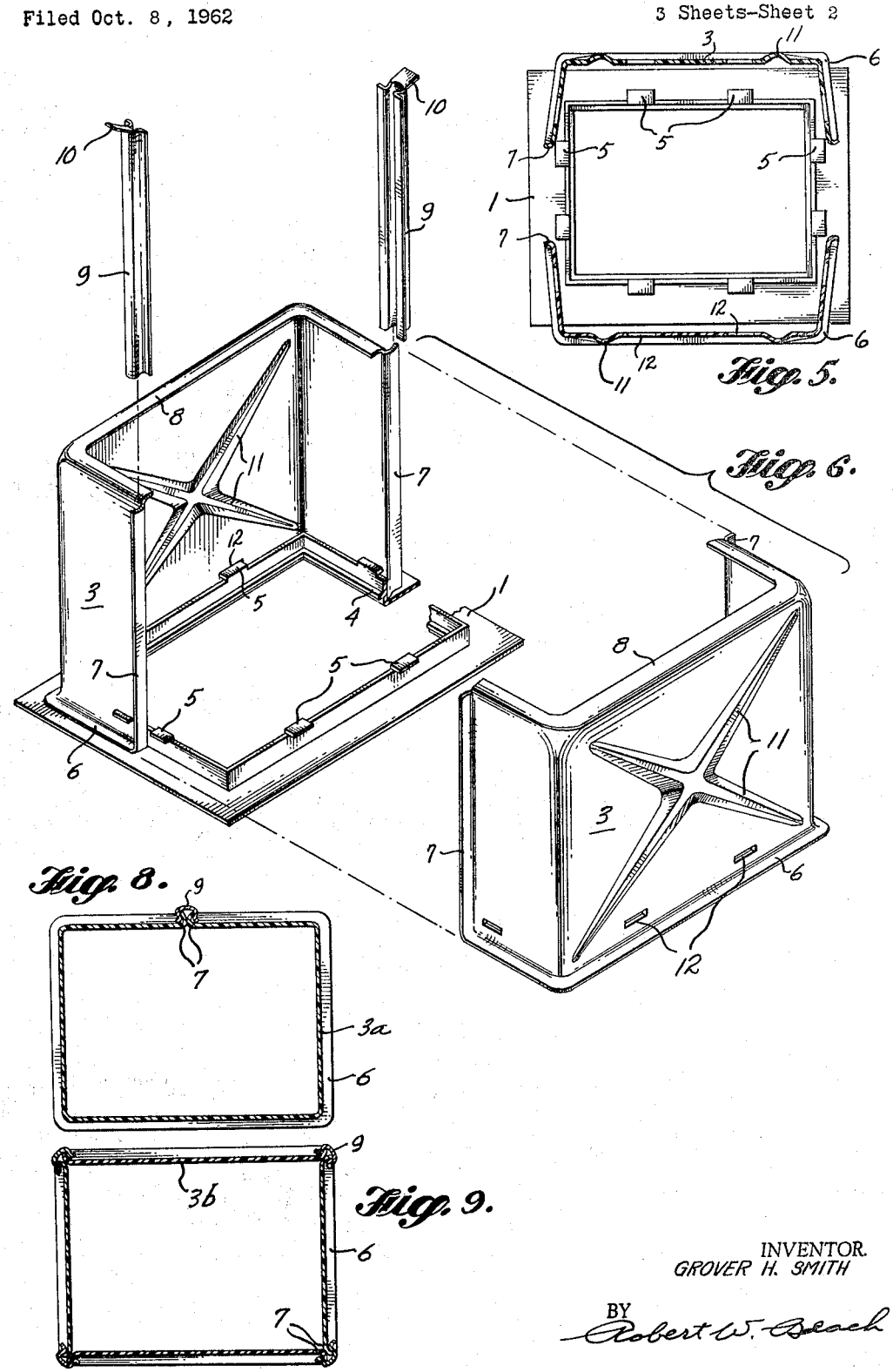
INVENTOR.
GROVER H. SMITH
BY
Robert W. Beach
ATTORNEY Aug. 2, 1966 G. H. SMITH 3,263,853
UNDERGROUND METER BOX
Filed Oct. 8, 1962 3 Sheets-Sheet 3
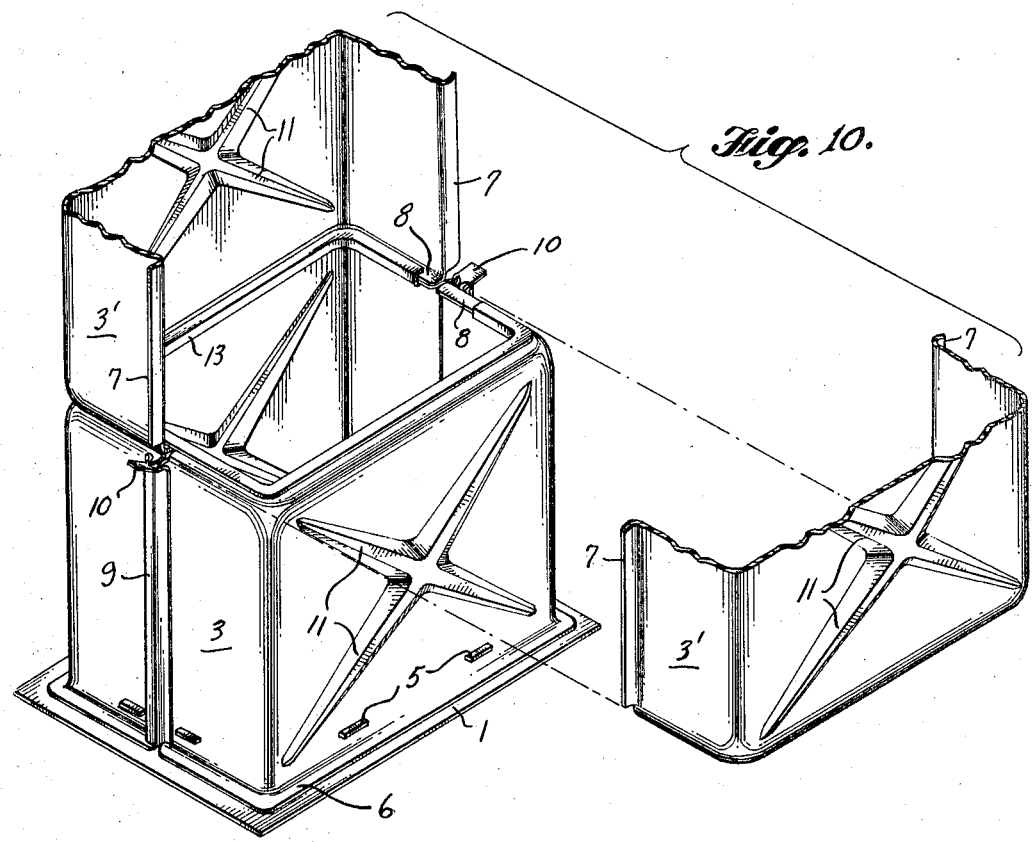
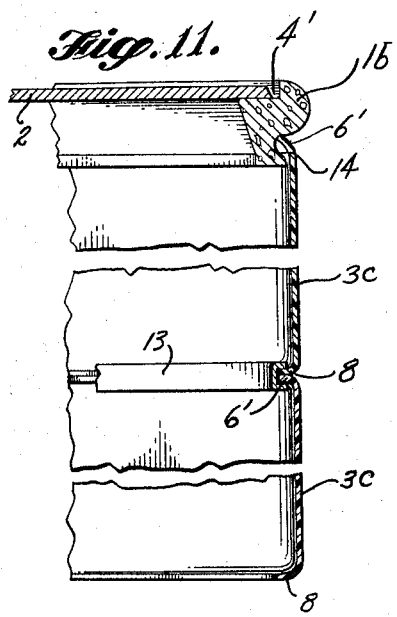
INVENTOR.
GROVER H. SMITH
BY
Robert W. Beach
ATTORNEY United States Patent Office 3,263,853
Patented August 2, 1966

3,263,853
UNDERGROUND METER BOX
Grover H. Smith, 4609 6th Ave. S., Seattle, Wash.
Filed Oct. 8, 1962, Ser. No. 229,106
1 Claim. (Cl. 220—18)

This invention relates to underground boxes for housing water meters, such as are commonly used for measuring domestic, commercial and industrial water usage.

It is customary, wherever possible, to locate a water meter in an underground housing, although, in some climates having severe winters, such water meters are placed in the basement of a house or other building. Where water meters are located underground it is customary to house them in a meter box, which ordinarily is made of concrete or cast metal having an open bottom and a removable rim, the opening through which may be closed by a cover. Such meter boxes are so heavy that it is difficult to install them and they cannot be shipped economically for any great distances. Such meter boxes are awkward to handle because they must be made sufficiently heavy and strong to withstand the pressure of dirt against them and frequently must be sufficiently strong to bear the weight of traffic to protect the meter.

It is the principal object of the present invention to provide a meter box having adequate strength to withstand any expected degree of pressure which may be exerted against it, and which can even withstand the weight of traffic passing over it, if necessary, while still being sufficiently light to be shipped easily and economically and to be handled readily during installation.

It is a further object to provide such an underground meter box of sectional construction, the sections of which can be assembled readily for use, but which are of a type to enable the sections of a large number of meter boxes to be nested compactly and easily for storage or shipment. It is also an object to provide such sections which will be constructed sufficiently accurately to be interchangeable from one meter box to another, so that it is unnecessary to assemble together the pieces of a particular meter box.

Another object is to provide a meter box construction in which the various pieces are interfitted, interengaged or interlocked when assembled, so as to provide mutual support and stiffening action for making a rigid and strong assembled meter box.

It is also an object to provide such a meter box which is not only light and strong, but which is durable and will not be deteriorated by contact with the ground, yet will be economical to manufacture, particularly by mass production techniques.

A further object is to provide a meter box construction which can be fabricated of different depths on the job as may be required by arranging several similar units in stacked relationship.

The foregoing objects can be accomplished by the combination of an endless rim fitting the upper edge of a thin-walled casing having in it at least one upright joint and which is resilient, so that the circumferential extent of the casing can be altered as may be necessary to assemble the meter box, or for nesting casing parts for storage or shipment. Preferably, such rim and the adjacent edge of the casing are interlocked by interengaged flange and groove elements, or lug and socket elements, which are secured together by the procedure of assemblying the meter box. Preferably, all of the casing wall edges are flanged, both for stiffening such edges and enabling such flanges to be connected to adjacent edge flanges. Side panels of the casing can be stiffened by suitable rib formations, such as crossed diagonal ribs. Adjacent edge flanges can be interconnected by channel-shaped clamping strips.

FIGURE 1 is a top perspective of an underground meter box installation showing the cover in elevated position, FIGURE 2 is a horizontal section through the meter box looking upward on line 2—2 of FIGURE 3 and FIGURE 3 is a vertical section through the meter box on line 3—3 of FIGURE 2.

FIGURE 4 is a fragmentary detail endwise view of a casing joint.

FIGURE 5 is a horizontal section through the meter box looking upward, similar to FIGURE 2, with parts shown in partially demounted relationship. FIGURE 6 is a perspective of the meter box in inverted position, with parts broken away, and with pieces of the meter box being shown in exploded relationship.

FIGURE 7 is a vertical section through a modified type of meter box structure.

FIGURE 8 is a horizontal section through a meter box casing of a different type and FIGURE 9 is a similar horizontal section through a meter box casing of still another type.

FIGURE 10 is a top perspective of a meter box including stacked casing units, parts being broken away, and one section being shown in exploded relationship.

FIGURE 11 is a fragmentary vertical section through an alternative type of meter box construction.

The meter box is composed of three principal components, namely, an endless rim 1, a cover plate 2, of a size and shape to fit in and close the aperture in the endless rim, and a casing 3 enclosing the meter M and supporting the rim on its upper edge. Preferably, the cover plate fits flush with the upper surface of the rim 1 and the inner periphery of the rim has an internal ledge recessed below its upper surface, which is shown as the continuous internal flange 4 on which the cover plate can seat. Such rim is generally of angle-shaped cross section, as shown best in FIGURES 3 and 6, and its downwardly projecting flange has one or more projections projecting outwardly from it, preferably in the form of lugs 5, for interlocking engagement with sockets in the upper edge portion of the casing. Such rim and cover plate are preferably made of light strong metal, such as cast, rolled, or forged steel, or rolled or forged aluminum alloy.

The casing component 3 is a thin shell made preferably of strong light sheet plastic material, such as molded fiber-reenforced polymerized resin. The reeinforcing fiber used may, for example, be glass fiber cloth or glass fiber mat, and the resin employed may be any of the well-known polyester resins, although other types of resins, such as suitably reenforced phenolic resins, may be satisfactory. The important characteristics of the resin employed for making the casing are strength, hardness without brittleness, lightness and the ability to resist deterioration while in contact with moist earth over extended periods. The term plastic as used in this specification has reference to material of this character. While it is preferred that the casing be of such plastic material it is feasible to use other sheet material for this purpose, such as aluminum alloy, or stainless steel, but usually these materials would be more expensive, more difficult to fabricate and more expensive than suitable plastic material. Its wall thickness is $\frac{1}{16}$ to $\frac{1}{8}$ of an inch.

Unless an exceptionally deep meter box is required, the sheet material of which the casing 3 is made preferably extends continuously between the top and bottom of the casing. The casing wall may be composed of one or more pieces, but preferably it is not peripherally endless but has at least one vertical joint the edges of which are relatively movable to vary the size of the casing periphery. The type of casing shown in FIGURES 1 to 6, inclusive, is composed to two channel-shaped pans of identical construction, which are shown best in FIGURE 6. Each of these sections has flanged edges, the upper edge flange 6 being of the external type, the upright flanges 7 also being of the external type and the bottom flange 8 being an internal flange. The web of the channel-shaped section in each instance is more than twice the horizontal extent of that of the adjacent side, so that when the edges of the two channel sides are in abutment the casing is of substantially rectangular shape in horizontal section, as shown in FIGURE 2, and the upright casing joints are located approximately at the centers of the casing ends.

The edge flanges 6, 7 and 8 stiffen the edges of the sheet material and provide bearing surfaces for adjacent elements. The upper edge portion of each casing section is sufficiently large to fit around the downwardly projecting flange of the rim 1 and the upper edge flange 6 of the casing section may be disposed in bearing engagement with the undersurface of the horizontal flange of the rim. Downwardly acting loads to which the rim 1 may be subjected are therefore transmitted effectively to the casing wall. The external upright flanges 7 of adjacent casing edge portions can be secured together to form a strong joint by sliding over such a pair of adjacent flanges a channel-shaped clamping strip 9. A tab 10 projecting from one end of such strip serves conveniently as a handle by which the strip can be slid lengthwise along the joint. Such clamp strips are preferably made of strong metal, such as stainless steel, or heat treatable aluminum alloy. The lower internal flange 8, in addition to stiffening the lower edge of each casing section, provides a bearing surface for the lower edge of the casing on the ground, or on a corresponding flange of a casing unit beneath it.

The side panels of the casing sections can be stiffened by a suitable integral rib formation, which may, for example, be in the form of crossed diagonal ribs 11 projecting outward from the casing surface, as shown in FIGURES 1 and 3. These ribs may taper from the central portion of the panel toward their ends. The material of which the casing is made, while being hard, should be at least somewhat resilient and it is preferred that the corners between the web and side portions of the channel-shaped sections and the corners between all flanges and the supporting portions of the casing sides be curved on a substantial radius to avoid stress concentration points. Moreover the joint flanges 7 may be curved in cross section to provide convex surfaces, as shown in FIGURE 4, which will facilitate retention of the clamp strips 9 in positions joining such flanges. The upper edge of the casing can be interlocked with the rim 1 by providing sockets in the upper edge portion of the casing to tilt the lugs 5 on the rim. Such sockets are shown best in FIGURE 6 as being slots 12 through the casing wall of a size, shape and location corresponding to the rim lugs.

The procedure for assemblying the meter box including two channel-shaped casing sections is illustrated best in FIGURES 5 and 6. The rim 1 is placed on the ground, or floor, with its upper surface down. Next, one of the sections of casing 3 is assembled on the rim by being inverted and having its flange 6 placed on the rim. By grasping with the hands the casing section edges bearing the flanges 7 the end portions of the casing section can be spread, as indicated in FIGURE 5, so that they will clear the lugs 5 projecting from the ends or shorter sides of the rim. The web of the casing section can then be slid toward the center of the rim until the slots 12 in the casing section web are engaged over the lugs 5 projecting outward from the longer side of the rim. When the casing section has thus been positioned the edges of the casing section bearing flanges 7 can be released so that the inherent resilience of the casing section will move its end portions toward the center of the rim so that the slots 12 on such portions will engage over the lugs 5. One casing section will then have been assembled with the rim in the position shown in the upper portion of FIGURE 6.

The same assembly operation is then repeated with the other section of casing 3, as indicated in FIGURE 5, until the slots 12 of both casing sections are engaged with the rim lugs 5 and the flanges 7 on the upright edges of the adjacent casing sections are disposed in abutment, as shown in FIGURES 2 and 4. With the handle tabs 10 uppermost the channel-shaped clamping strips 9 can then be slid downwardly from the positions shown in FIGURE 6 to embrace and clamp the abutting flanges, as shown in FIGURE 4, thus securing the two casing sections together. The parts of the casing should be designed so that there is sufficient tendency of the adjacent flanges 7 to separate, or of the flanges of the clamp strip 9 to move toward each other, or both, so that when the clamp strips have been moved lengthwise into the positions shown in FIGURES 1 and 3, they will be frictionally held in place securely.

In FIGURE 8 the casing 3a is generally of the same type as shown in FIGURES 1 to 6, inclusive, except that in this instance the casing has only a single upright joint and for convenience this is shown as being located centrally of one of the longer sides. Such a casing can be assembled on a rim 1 of the type described above simply by spreading the joint edges sufficiently far so that the side of the casing opposite the point edges and the casing ends are disposed in the same angular relationship as the sides and end portions of the sections of casing 3 shown in FIGURE 5. The casing side opposite the joint can be moved toward the center of the rim to engage the slots in that side with the lugs, whereupon the joint edges can be moved toward each other to move the slots 12 in the opposite ends over the end lugs 5 of the rim 1. The joint edges are then moved toward the center of the ring so that the slots 12 in the two side sections are engaged with the lugs 5 on the joint side of the rim 1. With the casing 3a thus wrapped around the rim a clamp strip 9 can be slid over the adjacent flanges 7, in the manner shown in FIGURE 4, again to secure the casing in place on the rim.

The casing 3b shown in FIGURE 9 again is similar to the casing structure of FIGURES 1 to 6 and 8. In this instance, however, the casing is composed of four separable panels, two forming its sides and the other two forming its ends. Each side and end panel may therefore be assembled separately onto the rim 1 by engaging its flange 6 with the horizontal flange of the rim and moving the panel toward the center of the rim until the casing panels engage the upright flange of the rim. With the panels in this position the upright flanges 7 on the opposite upright edges of the panels will be located at the corners of the rim with the flanges of adjacent edges of adjacent panels in substantially abutting relationship. With this construction the flanges are disposed at an angle to their panels of approximately 45 degrees, instead of 90 degrees as are the flanges 7 shown in FIGURES 2, 4 and 8. The flanges at each corner can then be secured together by a clamp strip 9 being slipped over them, as described above, in order to complete assembly of the casing.

In describing all of the meter box structures above, it has been assumed that the casing components will be assembled onto a rim of the type shown best in FIGURES 3, 5, and 6. Such casing structures can, however, be employed with a rim of the type shown in FIGURE 7 instead, if desired, whether or not such casing sections have lug receiving slots 12 in them. The rim 1a, while basically of angle cross section like the rim 1, has a shorter upright flange which does not project downward below the internal rib or flange 4 forming the ledge on which the cover plate 2 is supported. While the rim 1a will fit within the upper portion and over the upper edge of each type of casing described, therefore, such rim will not be interlocked with the casing by lug and socket engagement, as in the constrcution where a rim of the type shown in FIGURES 3, 5 and 6 is used. In assemblying such a meter box, however, the casing pieces can be assembled around the upright flange of the rim 1a when such rim is in inverted position, as has been described above. Alternatively, the casing sections can be assembled into a complete casing independently of the rim 1a and such rim can then be set into the upper portion of the assembled casing. Also, a rim of the type shown in FIGURE 7 can be used with a similar type of casing having an endless wall. In such case the top of the casing should still have an external stiffening flange 6 and its lower edge should have an internal stiffening flange 8, as shown in FIGURE 7.

The casings described above can be stored and shipped in assembled condition, if desired, but if they are to be thus shipped, or stored, it is preferred that they taper downward somewhat both in length and in width so that the casing components of a number of meter boxes can be stacked in nesting relationship. The casing structure shown in FIGURES 1, 2, 5 and 6 can, however, be stored and shipped more compactly. The channel-shaped casing units can be nested and nested groups of casing sections can be packed, or stacked, with the sides of alternate nested groups facing oppositely and with the end portions of the nested group interleaved so that each nested group will embrace end portions of two adjacent nested groups which face in the opposite direction. The nested groups may thus be interfitted with the side panels disposed either horizontally, or vertically.

For some installations it is desirable to provide an exceptionally deep meter box. Such a meter box can be fabricated from components similar to those described above by placing two or more casing components in stacked relationship, as indicated in FIGURES 10 and 11. In FIGURE 10 the meter box is shown in inverted position, as it is in FIGURE 6, and the casing component 3 shown in this figure is the same as the casing component shown in FIGURES 1 tnd 6. On top of this casing component is shown a second casing component 3' which would become the lower casing component when the meter box is installed in the ground. If the casing component 3' is of the same type as the casing component 3, the casing component 3' will be inverted so that its internal flange 8 is in abutment with the internal flange 8 of the casing component 3. Such internal flanges can be secured together to connect positively the two casing units 3 and 3' by a yoke ring 13 of channel-shaped cross section, which may be endless.

To install the yoke ring 13 it is applied to the bottom internal flange 8 of one channel-shaped casing section when that section has been assembled with the rim 1, as shown in FIGURE 6. When the second channel-shaped casing section is then assembled with the rim from the lower position of FIGURE 6 by spreading its side portions in the manner indicated in FIGURE 5, such spreading of the side portions will enable the portions of internal flange 8 carried by them to be fitted into the yoke ring 13. If, however, a rim 1a of the type shown in FIGURE 7 is being used, it will not be necessary to spread the side portions of the second casing section, but the flanges 8 on such side portions can simply be slid into the hollow of the yoke ring. Similarly, the two sections of casing 3' can simply be slid toward each other to engage the internal flanges 8 in the ring groove and when the flanges 7 of the casing sections are clamped together by the strips 9 the internal flanges cannot escape from the peripheral groove of the yoke ring.

If casing units of the type shown in FIGURE 8 designated 3a are to be secured in stacked relationship, the provision of the single joint will enable the upright abutting edges to be spread and pulled outward from the central portion of the casing so that the portion of the internal flange on the side opposite the casing joint can be engaged in the groove of one side of the yoke ring 13. The upright joint edges can then be moved toward each other to draw the flanges 8 on the end portions of the casing into the portions of the yoke ring groove on the ends of such ring, and finally the upright joint edges can be moved toward the center of the casing to insert the internal flange portions on the jointed side of the casing into the ring groove. By then sliding the clamping strip 9 over the upright flanges 7 to connect them, the casing will be held in positively assembled relation to the yoke ring.

A casing unit 3b of the type shown in FIGURE 9 can also be employed as one or more of the casing units in a stacked assembly of the type shown in FIGURE 10 forming a deep meter box. Each panel of such a structure can be moved separately to engage its inner flange 8 in the groove in a corresponding side of the yoke ring 13. When two adjacent casing panels are thus assembled with the ring their adjacent edges can be connected by sliding a clamp strip 9 over their flanges 7. Alternatively, an adjacent side panel and end panel can be connected by a clamp strip before such side and end are assembled with the yoke ring, and then the other side panel and end panel can similarly be connected before being assembled with the yoke ring. The two angle-shaped assemblies thus fabricated can then be slid toward each other and toward opposite corners of the yoke ring until the upright edges of the casing assemblies adjacent to the opposite corners of the ring are in adjacent relationship, whereupon such upright edges can be connected by clamping strips 9 slid into place to embrace their flanges.

If, as mentioned above, the casing unit 3' shown in FIGURE 10 is the same as the casing unit 3 in having an internal flange on one peripheral edge and an external flange on the other peripheral edge, the flange on the lower edge of the assembly, as installed, will be an external flange instead of an internal flange. Such a flange will still afford adequate bearing on the ground for the deep meter box assembly. Particularly if a meter box deeper than the height of two stacked casing units is desired, however, it will be preferable to utilize casing units of the 3c type shown in FIGURE 11. Use of such units will enable any desired depth of meter box to be fabricated by superimposing casing units into which all adjacent units will be connected by a yoke ring 13 of channel section, as described above. The casing unit 3c may have any number of upright joints, like the casings 3, 3a and 3b, discussed above, but differs in that instead of having an external flange 6 on one end edge it has an internal flange 6' on such edge, as well as the internal flange 8 on its opposite edge. The adjacent edge flanges 6' and 8 on the adjacent edges of stacked casing units can be assembled with the yoke ring 13, in the manner described in connection with FIGURE 10, depending upon the type of wall construction used for such casing units and if more than two casing units are assembled in stacked relationship the additional horizontal joints can be made by applying the yoke rings to the horizontal joints in the same way.

Where the uppermost edge of the meter box casing has an internal flange, as shown in FIGURE 11, instead of an external flange, as shown in FIGURES 2, 3, 6 and 10, for example, it is preferred that a different type of rim, designated 1b in FIGURE 11, be employed. While such rim could be made of metal it is preferably made of plastic material, such as concrete, or a resin and concrete mixture, which may be suitably reenforced by embedding in it circumferential reenforcing rods or wires. The cross-sectional shape of the rim 1b is such as to provide a ledge 4' on which the cover plate 2 is supported substantially flush with the upper surface of such rim. Around the exterior of the rim is a groove 14 in which the casing unit internal flange 6' can be fitted and retained by the projection forming the bottom side of such groove being engaged in the socket formed beneath the flange 6' of the box body. Such body flange can be inserted into the socket formed by the rim groove in the same manner that the internal flange 8 of the two casing sections 3, the single casing section 3a, or the four casing sections 3b, is inserted in the circumferential groove of the yoke ring 8 and further description of the operation is not considered to be necessary. Assembly of the casing unit 3c on the rim 1b can, however, be expedited if the rim is in the inverted position corresponding to the position of the rim 1 in FIGURE 10 during such assembly operation.

I claim as my invention:

An underground meter box comprising a continuous generally planar rim, and a casing separate from said rim of thin, strong, stiff sheet material and including an upper section and a lower section each of generally rectangular cross section and having at least one openable upright joint extending between its upper and lower edges, the upper edge of said upper casing section and said rim having projection and socket elements interengageable to interlock the rim and the casing by movement of the upper portion of said upper casing section wall relative to said rim substantially parallel to the plane of said rim, the lower edge of said upper section and the upper edge of said lower section having complemental internal flanges disposed in adjacent registry, a continuous internal yoke ring of channel, generally rectangular cross section receiving said upper and lower section flanges by movement of said flanges into the ring channel substantially parallel to the plane of said ring when said upright joints are open, and means holding said joints closed for securing said rim and casing projection and socket elements in interengagement and said flanges in said yoke ring channel with said channel securing together said upper and lower section flanges.

References Cited by the Examiner

UNITED STATES PATENTS

| | | | |
|---|---|---|---|
| 343,933 | 6/1886 | Walker | 220—3.8 X |
| 406,683 | 7/1889 | White. | |
| 1,509,218 | 9/1924 | Walsh | 220—80 |
| 1,752,134 | 3/1930 | Woodman | 220—5 |
| 1,865,203 | 6/1932 | Nelson | 239—361 |
| 1,960,003 | 5/1934 | Ford | 220—3.4 X |
| 1,991,160 | 2/1935 | Knight | 220—3.7 |
| 2,182,201 | 12/1939 | Harris | 220—80 X |
| 2,709,634 | 5/1955 | Blashfield | 220—3.5 X |
| 2,751,109 | 6/1956 | Moore. | |

FOREIGN PATENTS

| | | |
|---|---|---|
| 1,540 | 1877 | Great Britain. |
| 136,942 | 12/1919 | Great Britain. |
| 306,047 | 5/1930 | Great Britain. |

FRANKLIN T. GARRETT, *Primary Examiner.*